Sept. 26, 1961 A. C. DAMAN 3,001,730

DUPLICATE SECTION GRINDING MILL

Filed Jan. 24, 1958 7 Sheets-Sheet 1

INVENTOR.
Arthur C. Daman
BY
McGrew and Edwards
ATTORNEYS

Sept. 26, 1961 A. C. DAMAN 3,001,730

DUPLICATE SECTION GRINDING MILL

Filed Jan. 24, 1958 7 Sheets-Sheet 2

INVENTOR.
Arthur C. Daman
BY
McGrew & Edwards
ATTORNEYS

INVENTOR.
Arthur C. Daman
BY
McGrew and Edwards
ATTORNEYS

INVENTOR.
Arthur C. Daman
BY
McGrew and Edwards
ATTORNEYS

DUPLICATE SECTION GRINDING MILL

Filed Jan. 24, 1958

INVENTOR.
Arthur C. Daman
BY
McGrew & Edwards
ATTORNEYS

Sept. 26, 1961 A. C. DAMAN 3,001,730

DUPLICATE SECTION GRINDING MILL

Filed Jan. 24, 1958 7 Sheets-Sheet 6

INVENTOR.
Arthur C. Daman
BY
McGrew and Edwards
ATTORNEYS

Sept. 26, 1961 A. C. DAMAN 3,001,730

DUPLICATE SECTION GRINDING MILL

Filed Jan. 24, 1958 7 Sheets-Sheet 7

INVENTOR.
Arthur C. Daman
BY

ATTORNEYS

United States Patent Office 3,001,730
Patented Sept. 26, 1961

3,001,730
DUPLICATE SECTION GRINDING MILL

Arthur C. Daman, Denver, Colo., assignor, by mesne assignments, to Denver Equipment Company, Denver, Colo., a corporation of Colorado Filed Jan. 24, 1958, Ser. No. 710,999
8 Claims. (Cl. 241—183)

This invention relates to grinding mills and more particularly to mills adapted for either wet or dry grinding in batch or continuous operations.

Ore milling processes require reduction of the ore to fine sizes in order to free the valuable constituent from associated matter of its natural formation for subsequent separation by recovery processes. In many treatments the materials under treatment are corrosive and the metallic surfaces of the equipment contacted by such materials have to be covered by a corrosion-resistant lining, such as rubber.

Drum type grinding mills are difficult to line because of their shape, and the vibration, impact and corrosion resulting from the rotation and tumbling of material in the mill render the usual liner fastenings inadequate. If the liner is broken and allows liquid to penetrate to the metal shell severe damage may result before the operator learns of the condition, as visual inspection is not possible when the mill is operating on a continuous basis. Consequently, periodic inspection is scheduled, but frequently damage has occurred before inspection requiring substantial reconstruction to put the equipment in operation again.

The present invention represents a departure from conventional practice in providing a spherical mill rather than a drum or cylindrical type, and in having two duplicate sections arranged to be joined to complete the mill enclosure with each section comprising an integral assembly of shell and liner portions. The joining arrangement provides a fluid-tight closure and the duplicate trunnions provide a two-bearing mounting permitting balanced rotation with minimum vibration and a selective driving arrangement.

It is an object of my invention to provide simple, durable and efficient grinding apparatus adapted for wet or dry grinding in either batch or continuous operations. Another object of the invention is the provision of a grinding mill formed of two standard duplicate sections, permitting replacement of either section with another duplicate section whenever repairs or reconditioning are required.

A further object of the invention is to provide a simple and efficient mounting for a rotary grinding mill providing for operation about a horizontal axis during grinding and movement to a vertical position for discharge of the ground product.

Other objects reside in novel details of construction and novel combinations and arrangements of parts, all of which will be described in the course of the following description.

The practice of the invention will be best understood by reference to the accompanying drawings in the several views of which like parts bear similar reference numerals, and in which.

Figure 1:
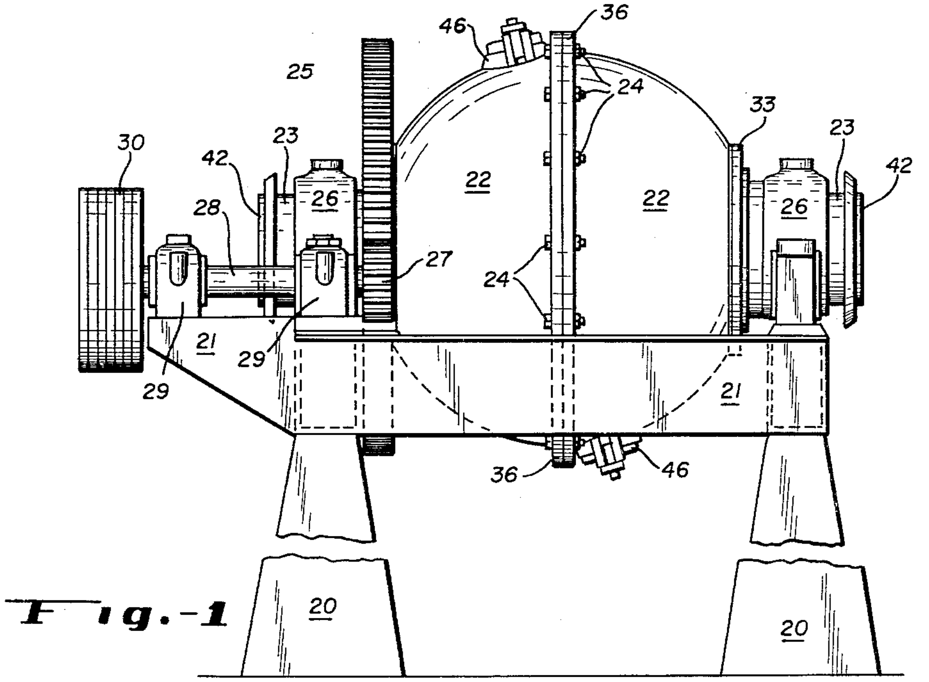
FIG. 1 is a side elevation of a grinding mill according to my invention showing one form of base mounting and drive for the mill.
Figure 2:
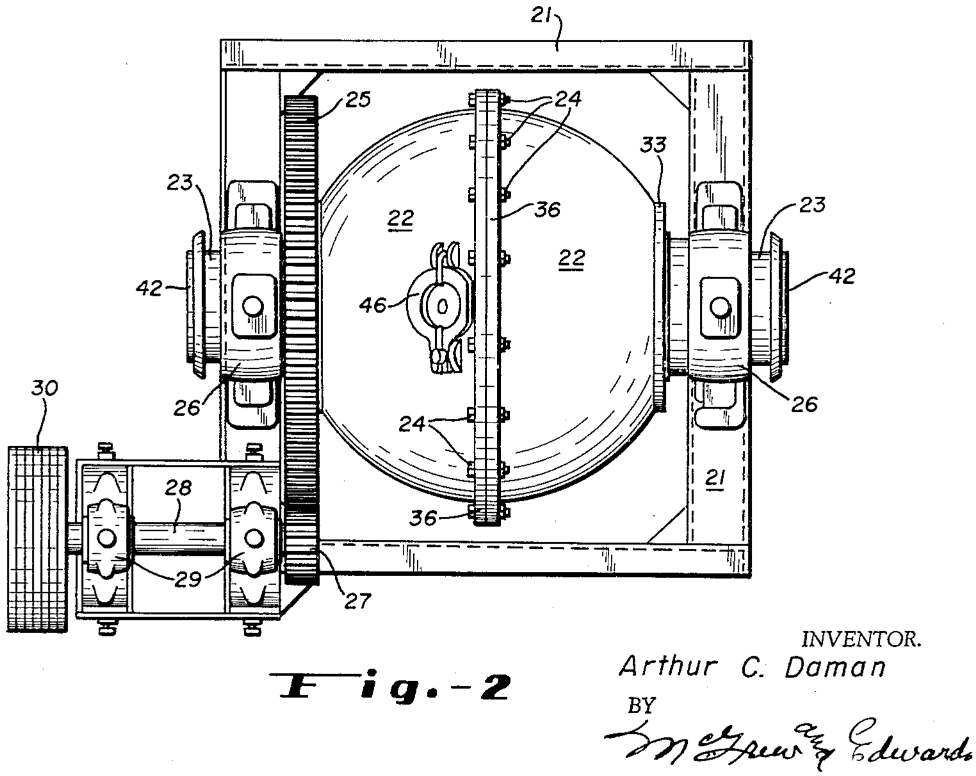
FIG. 2 is a top plan view of the mill shown in FIG. 1.
Figure 3:
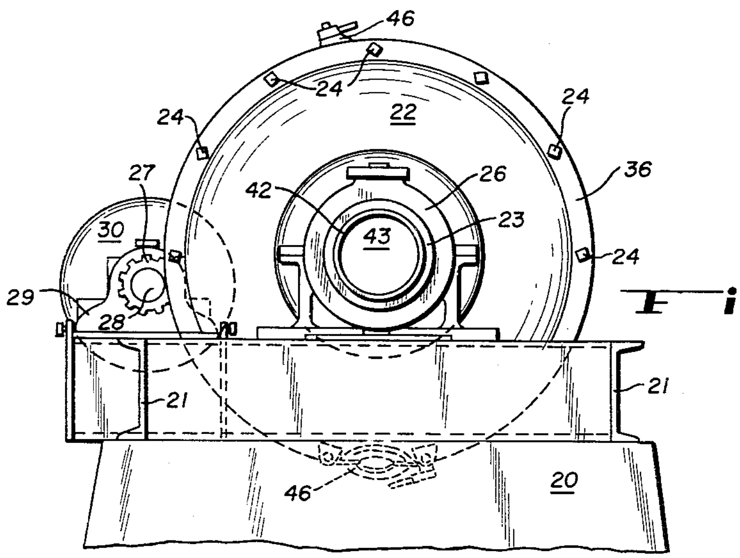
FIG. 3 is an end elevation of the mill shown in FIG. 1 viewed from the discharge end.

As shown in FIGS. 1, 2 and 3, a mill installation embodying features of this invention comprises a foundation 20 or other suitable support for a framework 21 on which the components of the mill are supported with the axis of rotation of the mill inclining slightly from feed end to discharge end so as to provide gravity flow and discharge. The mill of this embodiment comprises two duplicate sections 22, each having an integral trunnion portion 23, and joined as an integral structure, as by bolts 24 or other suitable fastenings.

Figure 4:
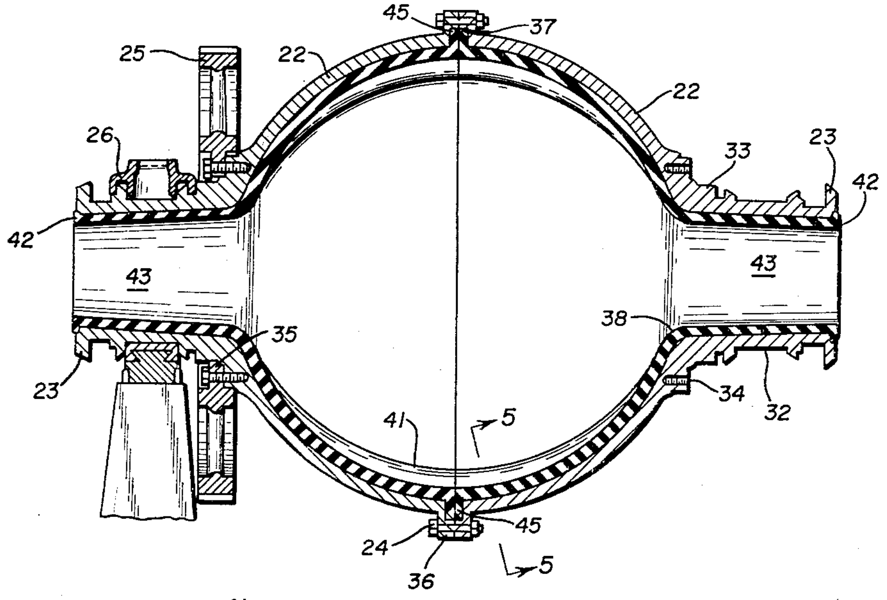
FIG. 4 is an enlarged fragmentary vertical section through the mill of FIG. 1 showing the manner of fastening the mill sections.

A bull gear 25 is mounted on the trunnion at the feed end of the mill and both trunnions 23 are journalled in bearings in bearing housings 26 supported on the framework 21. The gear 25 is driven by a pinion 27 carried on a shaft 28 supported by bearings in bearing housings 29. As shown in FIG. 4, the trunnion 23 has a machined portion 32 providing the journal for the bearing in bearing housing 26, and adjacent to the journal an annular seat 33 is provided for the bull gear 25 and adjacent thereto a plurality of threaded openings 34 are provided for reception of screws 35 which hold the gear on the mill for conjoint rotation with the mill. Each section 22 has a flange 36 and an inner recessed portion 37 adjacent said flange, and a liner 38 extends from the outer end of trunnion 23 in contact wtih the inner surface of section 22 to and inclusive of recess 37.

Figure 5:
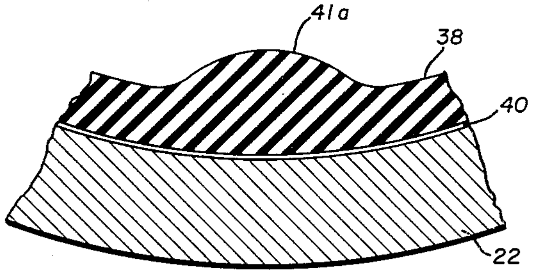
FIG. 5 is an enlarged section through a mill and liner section taken along the line 5—5 of FIG. 4 and illustrating one type of lifter forming a part of the liner.
Figure 6:
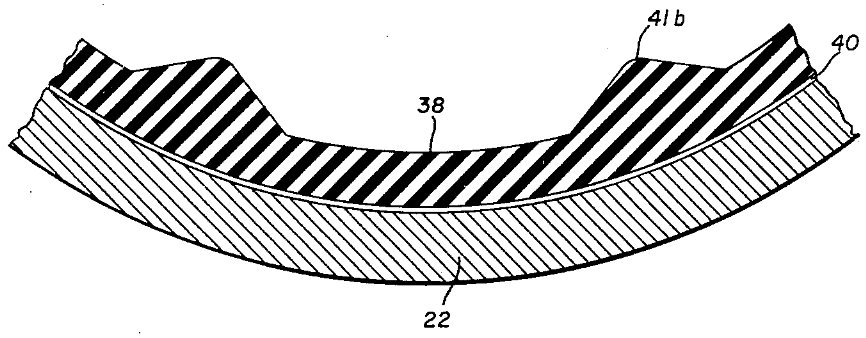
FIG. 6 is a fragmentary section illustrating another form of lifter.

As shown in FIGS. 4, 5 and 6 the liner 38 is bonded to the interior surface of section 22 by a suitable adhesive composition 40 and at intervals about it inner peripheral extent has a series of ridges or lifters 41 extending substantially parallel to the lengthwise axis of the mill. In the form shown in FIG. 5 the lifters have rounded surfaces **41*a*, and in the form of FIG. 6 the lifters 41*b* are of triangular section. The outer end 42 of liner 38 is outwardly flanged about the opening or passage 43 in trunnion 23 and the inner end of the liner has an outwardly extending flange 45 fitted into recess 37. The flange 45 is of greater volume than recess 37 and when bolts 24 are drawn tight, the adjoining flanges 45** are squeezed into fluid-tight engagement and form a pressure seal which adds to the structural strength of the hemisphere portions in supporting the load within the mill.

The mill section 22 shown in FIG. 1 is provided with an opening which is covered by a closure member 46, the details of which will be described later. In smaller sized mills this opening functions as a feed inlet or discharge outlet when the opening 43 through trunnion 23 is closed, and in larger sized mills this same type of opening may be arranged as a manhole permitting inspection of and access to the mill interior.

Figure 7:
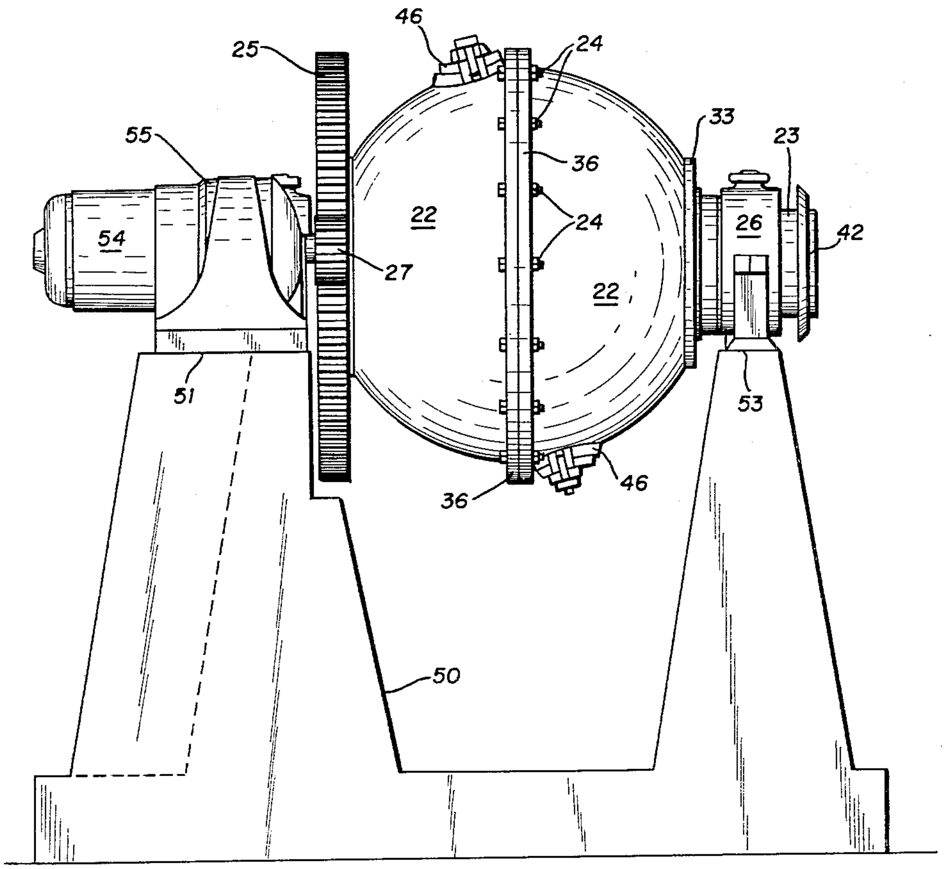
FIG. 7 is a side elevation of another form of base mounting and drive for a mill constructed according to my invention.
Figure 8:
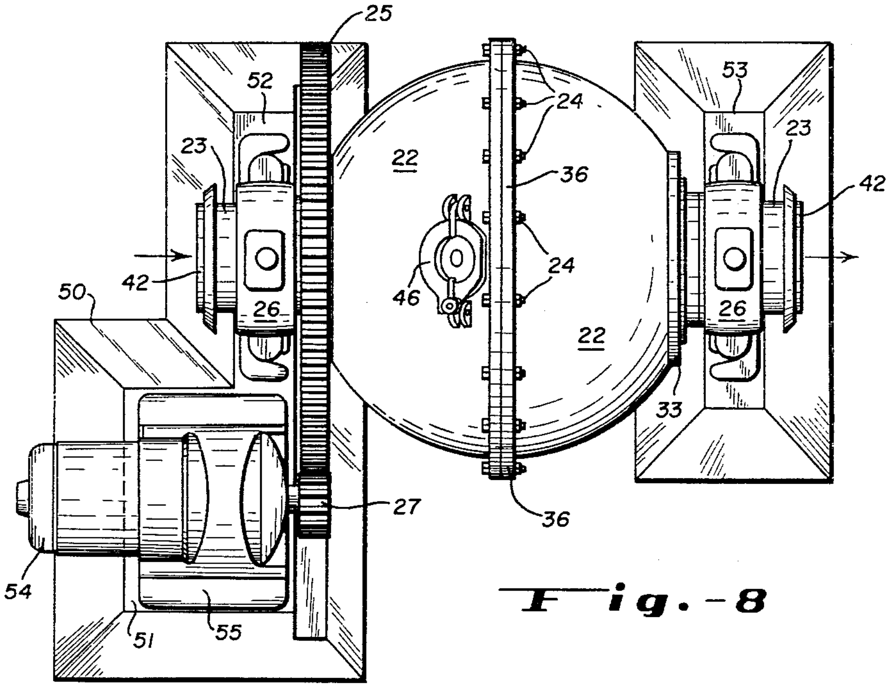
FIG. 8 is a top plan view of the mill of FIG 7.
Figure 9:
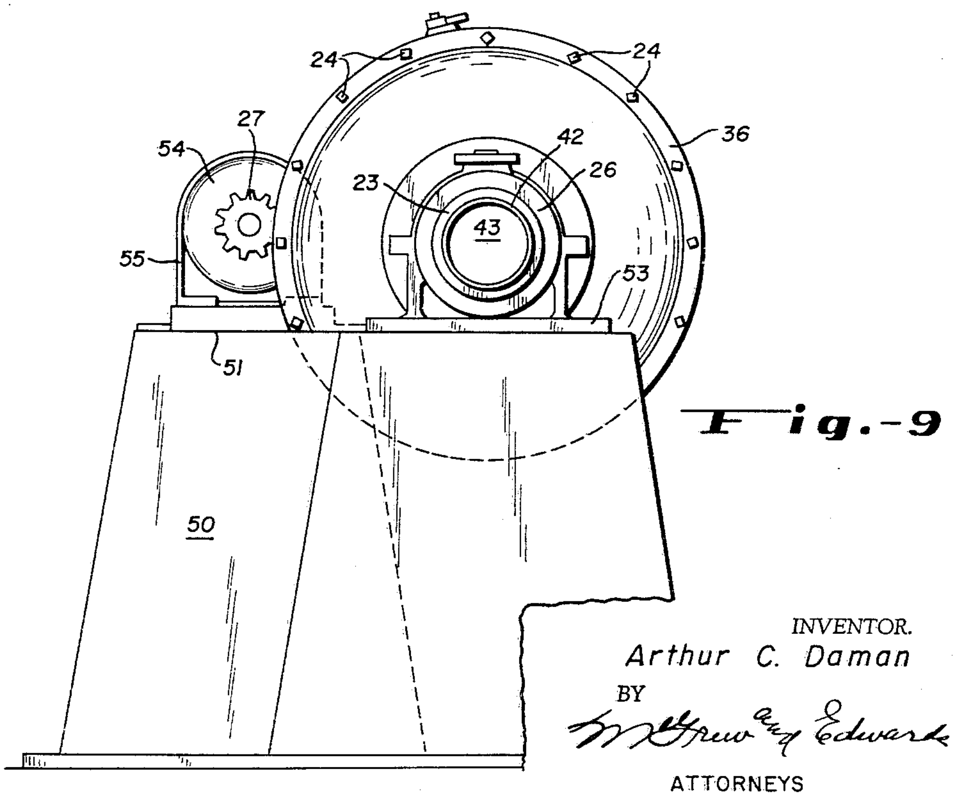
FIG. 9 is a fragmentary end view of the mill assembly of FIG. 7, viewed from the discharge end.

FIGS. 7, 8 and 9 illustrate a different mounting and drive for the mill of the present invention. In this form the metallic framework is eliminated and the foundation 50 provides a seating surface 51 for the power unit and other seating surfaces 52, 53 for the trunnion bearing housings 26. A bull gear 25 is mounted on the mill in the manner previously described and is driven by a motor 54, speed reducer 55 and pinion 27.

Figure 10:
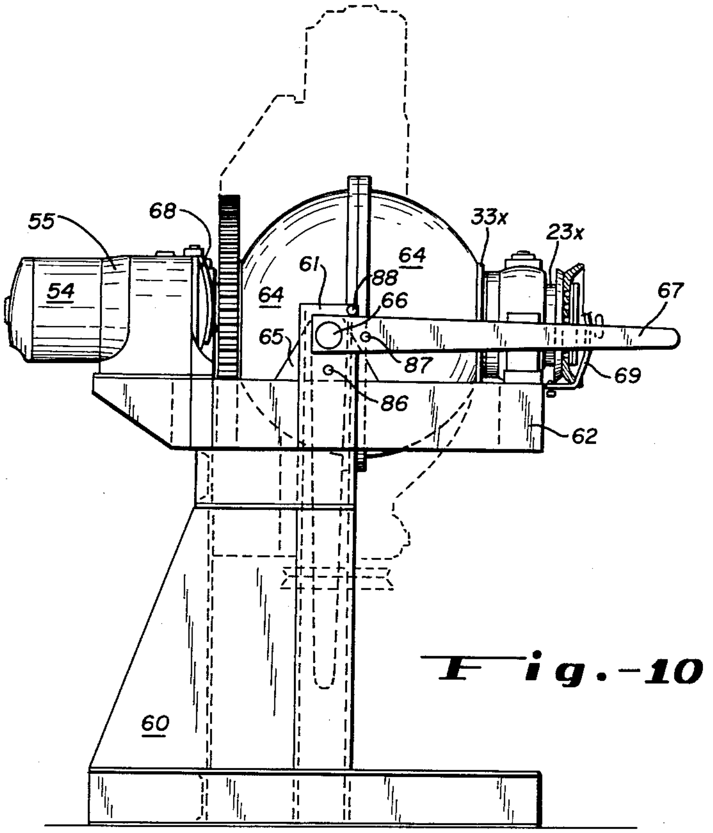
FIG. 10 is a side elevation of another mounting arrangement for a mill embodying my invention with the operating position shown in full lines and the discharge position in dash lines.
Figure 11:
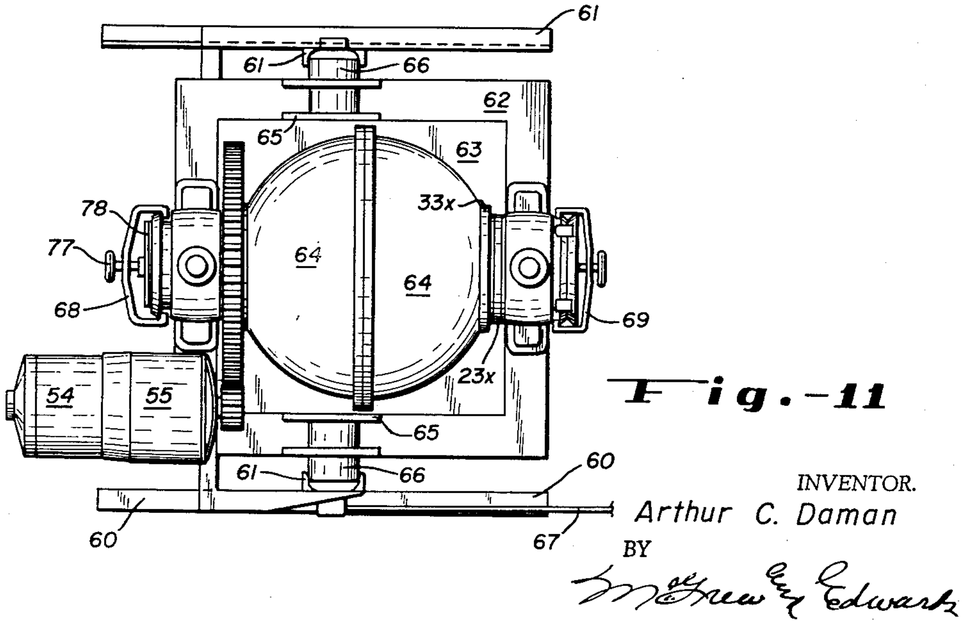
FIG. 11 is a top plan view of the mill shown in FIG. 10.
Figures 12, 13:
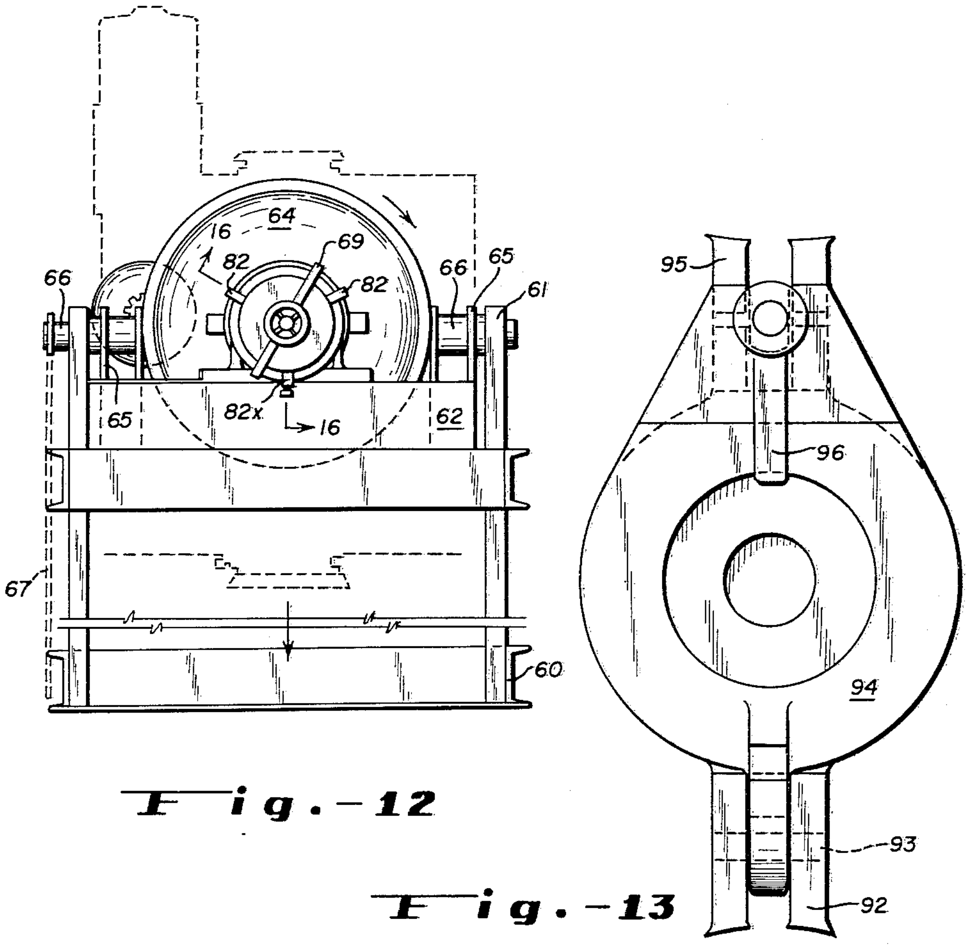
FIG. 12 is an end elevation of the mill of FIG. 10 with the discharge position shown in dash lines.
FIG. 13 is a top plan view of a drain hole of the mill drawn to an enlarged scale.

FIGS. 10, 11 and 12 illustrate another novel mounting arrangement particularly designed for utilizing the present mill in batch treatments, but also adapted for supporting other types of hollow trunnion mills for similar loading and unloading operations. In this form, the foundation or base member 60 preferably is of the two-legged type with relatively high upright sides 61 and the mill assembly is supported on a four sided frame 62 having a central opening 63 through which the lower portion of the mill extends. As illustrated the mill is formed of two duplicate sections 64 and is generally similar to the mill shown in FIG. 4 except for the omission of the drain openings 46.

Frame 62 is suspended by two pairs of straps 65 mounted on pivots 66 supported at the top of sides 61 and a handle 67 is provided to permit manual movement of frame 62 and its associated parts about pivots 66 from the solid line position shown in FIG. 10 to the dash line position, and return. The drive of the mill shown in FIG. 10 is the same as shown in FIGS. 7 and 8. The trunnions **23*x* of the sections 64 are provided with a quick detachable closure 68 at the feed end and a combined grate and closure member 69** at the discharge end.

Figure 15:
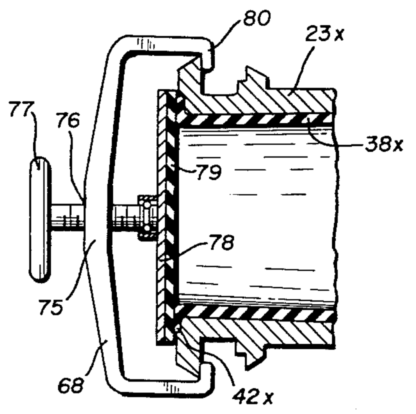
FIG. 15 is an enlarged fragmentary vertical section illustrating the feed trunnion closure of the mill of FIG. 10.

The details of closure 68 are shown in FIG. 15. The interior surface of trunnion **23*x* is protected by a liner 38*x* bonded as previously described and a duplicate of the liner 38 of FIG. 4. A bail 75 has a threaded central opening 76 in which a hand screw 77 is fitted. The screw carries a disc 78 at its inner end, provided with a bonded rubber liner 79 for engagement with the end 42*x* of liner 38. Flanges 80 on bail 75 grip the flange at the end of trunnion 23*x* and actuation of screw 77 draws liner 79 into fluid-tight engagement with liner 38*x***.

Figure 16:
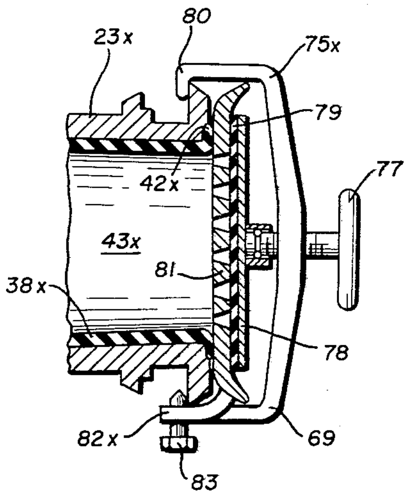
FIG. 16 is an enlarged fragmentary vertical section illustrating the grate and discharge closure of the mill of FIG. 10.

FIG. 16 shows the details of discharge closure 69. The bail **75*x* of this closure supports a grate 81 of stainless steel or other corrosion-resistant material which has three lugs cast integrally and arranged at 120° intervals (FIG. 12), two of said lugs 82 having flanged portions for gripping the end flange of trunnion 23*x*, while the third lugs 82*x* has a tapped opening for reception of a set screw 83 permitting the closure to be removed from or mounted on the trunnion 23*x*** with or without the bail assembly which is substantially identical to that shown in FIG. 15.

A hand screw 77 extends through a threaded opening in bail **75*x* and carries a disc 78 and bonded liner 79 of the type previously described, which moves into sealing engagement with the flat face of grate 81 for confining the mill contents, and which may be moved away as shown in FIG. 10 for discharge of such contents while retaining the ball charge. After discharging the mill contents in this manner loosening of set screw 83 permits the grate to swing away from the opening 43*x*** for removal of the ball charge as required.

Figure 14:
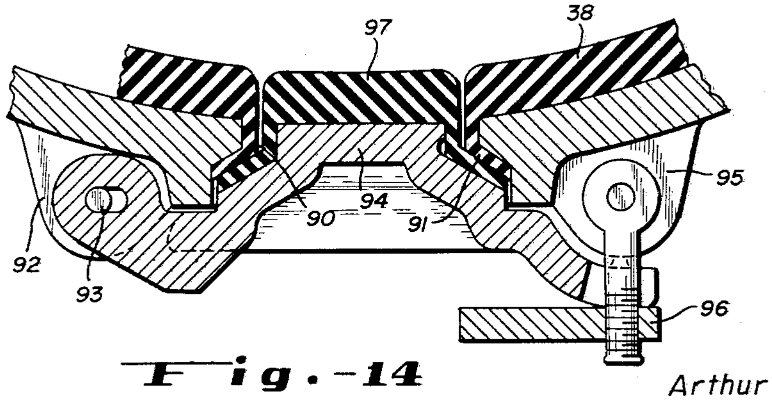
FIG. 14 is a vertical view through a drain hole of the type shown in FIG. 13 and illustrating the liquid sealing arrangement.

The details of drain closure 46 previously referred to have been shown in FIGS. 13 and 14. A round opening 90 in the mill section 22 is covered by an extension 91 of liner 38 bonded to the mill section. Two lugs 92 formed as a part of or fixedly held on mill section 22 support a hinge pin 93 on which a lid 94 is mounted to move in and out of opening 90. Two lugs 95 are mounted on the opposite side of opening 90 and support a swinging clamp 96 which in the locked position shown in FIGS. 13 and 14 hold a bonded rubber liner 97 on lid 94 in pressure-sealing engagement with extension 91 of liner 38. By swinging clamp 96 through 180° the lid 94 may be moved away from opening to permit filling or draining.

The mill shown in FIGS. 1, 2 and 3 is adapted for either continuous or batch treatments. When used in a batch treatment the uppermost drain closure 46 will be opened and the mill will be charged through such opening. The feed trunnion of the mill will be closed by the closure 68 as illustrated in FIG. 15 and the discharge trunnion will be closed by the closure 69 in FIG. 16. When used in continuous operation, the feed trunnion will be left open and the grate 81 will cover the discharge opening to pass the ground product and retain the ball charge. The sheave 30 will be connected to a suitable prime mover (not shown) and the mill will be rotated for whatever time is required to obtain the desired reduction of the charge to the mill. Dry grinding may be employed or wet grinding as desired. At the end of the grinding interval the lowermost closure 46 will be moved to a position in which it is on the vertical axis of the mill and then opened for removal of the mill contents.

When the mill is to be used in continuous operation the passages 43 in trunnions 23 will be left open and feed will be introduced at the feed end as by scoop (not shown) and liquid such as water may be introduced through a pipe (not shown), according to conventional practice. The mill will be rotated as previouly described and overflow discharge through discharge trunnion 23 may be delivered to a launder (not shown) for conducting it to the next stage of the treatment.

The mill shown in FIGS. 1, 2, 3 and 4 is formed of two duplicate sections preferably of hemispherical shape and provided with hollow trunnions 23 concentric with the axis of rotation. The sections 22 are drawn together by bolts 24 or other suitable fastenings which compress the flanges 45 of liner 38 producing a flow-back effect which directs the liner material toward the shell and constitutes an added factor in maintaining the integral arrangement of shell and liner. By having one or more units 22 available as replacements it is possible to keep a plurality of such mills in service with a minimum of shutdown time. If wear or other damage to the liner requires replacement a new section can be mounted at either end according to the service requirements and the mill is then ready to resume operation. The damaged section can be returned to the service installation for removal of the former lining and its replacement with a similar lining which will be bonded to the entire internal surface of the section.

The provision of the ends 42 upon the liner extending around the opening 43 assists in the fluid-tight seal whenever a feed closure 68 or a discharge closure 69 are used. Any of the liners 38 may utilize the lifter *41a* of FIG. 5 or *51b* of FIG. 6, both of which provide a retention surface for the material on the bottom of the arc of rotation which will be retained through the following rise in the rotation until the retention surface moves past the angle of repose.

The provision of the foundation and drive arrangements of FIGS. 1 and 7 gives the operator a choice in the type of power transmission to be used and in the floor space requirements of the plant. In either form the lengthwise axis of the mill will be placed at a slight inclination if continuous operation is employed which may be effected through the use of shims to position the bearing housings 26 at different elevations for support of the trunnions 23. When the mill ends are closed and the mill is fed and discharged through openings 46, the mill may be mounted on an exact horizontal axis if desired. The symmetrical shape of the sections 22 provides a balanced rotation with a minimum of bearing wear.

The mounting of the mill shown in FIGS. 10, 11 and 12 is particularly suited for dry grinding operations although wet grinding may be used if desired. The mill is moved by a lever or handle 67 to the vertical position indicated by the dash lines in FIG. 10 and charged or discharged in that position. Holes 86 are provided in side 61 at 90° positions about pivot 66 and register with a hole 87 in lever 67 permitting insertion of a pin 88 to lock the mill in the horizontal or vertical position. Thereafter the ends are closed, the mill is returned to the horizontal position and rotated for an interval determined by the character of the material under treatment. On completion of the grinding interval the mill is returned to the vertical position and the handwheel 77 will be actuated to move closure 78 away from grate 81 allowing the contents to flow from the mill. If desired the entire closure may be removed by actuation of set screw 83 as when it is necessary to reach the interior of the mill for clean-out purposes or for removal or replacement of the ball charge.

Figure 17:
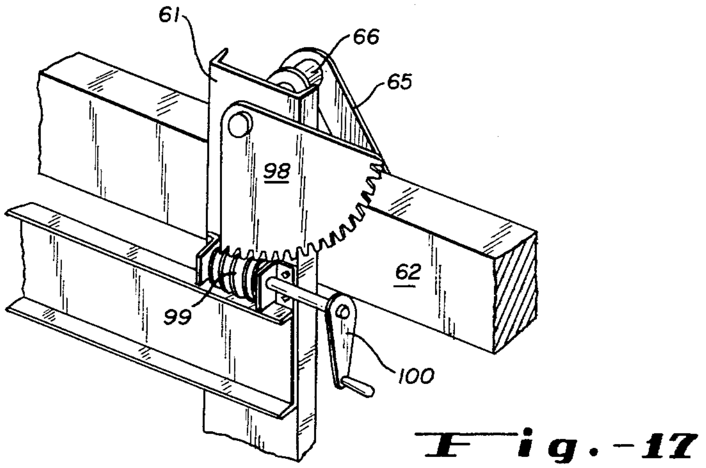
FIG. 17 is an enlarged fragmentary detail of an alternative arrangement for movement of the mill shown in FIG. 10 from horizontal to vertical, or vice versa.

Another arrangement for effecting the movement of the mill shown in FIG. 10 from horizontal to vertical or vice versa is illustrated in FIG. 17. A gear sector or quadrant 98 is fixed on the end of pivot 66 for conjoint rotation and engages a worm gear 99 which may be turned by a handle 100 to wind or rotate pivot 66 and thereby move frame 62 from a horizontal to a vertical position. This drive permits selective positioning of the mill throughout the 90° range of movement, and it is self-locking and the pivot 66 will be held against accidental movement by cessation fo the turning movement of handle 100.

Mills according to the present invention are particularly suited for reduction of corrosive materials as the only exposed metallic surface is usually grate 81 which is formed of non-corrosive metal such as stainless steel. In all these forms an integral bond is obtained between the shell and liner surfaces and any of the well-known agents for bonding rubber to metal may be used. Latex in a solvent, shellac and "Du Pont cement" are examples of the types of compositions which may be utilized in obtaining the bond. In order to assist the grinding action various types of grinding media may be utilized such as grinding balls, pebbles or the like. Ceramic grinding balls are particularly suited because of their resistance to corrosion.

I claim:

1. As a new article of manufacture, a rotary grinding mill section adapted to be joined with a duplicate section to form a symmetrical mill, comprising a hollow hemispherical body having its wider portion terminating in an external flange at one end for attachment to a similar flange of a duplicate section and having a narrower trunnion portion at its opposite end, and an integral liner coextensive with said portions having its outer surface shaped to conform to the interior surface of said section and bonded thereto as an integral assembly.

2. As a new article of manufacture, a rotary grinding mill section adapted to be joined with a duplicate section to form a symmetrical mill, comprising a hollow hemispherical body having its wider portion terminating in an external flange at one end for attachment to a similar flange of a duplicate section and having a narrower trunnion portion at its opposite end, and an integral rubber liner coextensive with said portions having its outer surface shaped to conform to the interior surface of said section and bonded thereto as an integral assembly.

3. As a new article of manufacture, a rotary grinding mill section adapted to be joined with a duplicate section to form a symmetrical mill, comprising a hollow hemispherical body having its wider portion terminating in an external flange at one end for attachment to a similar flange of a duplicate section and having a narrower trunnion portion at its opposite end, and a portion of the exterior of said trunnion being formed as a journal for support of the mill during its rotation, and an integral liner coextensive with said portions having its outer surface shaped to conform to the interior surface of said section and bonded thereto as an integral assembly.

4. As a new article of manufacture, a rotary grinding mill section adapted to be joined with a duplicate section to form a symmetrical mill, comprising a generally hemispherical body having a wider portion terminating in a recessed external flange at one end for attachment to a similar flange of a duplicate section and having a narrower trunnion portion at its opposite end, and an integral liner coextensive with said portions having its outer surface shaped to conform to the interior surface of said section including the recess of the flange and bonded to said interior surface as an integral assembly.

5. In a symmetrical grinding mill, a hollow body formed of two duplicate sections joined in end-to-end arrangement to provide a single chamber and mounted for rotation about a substantially horizontal axis, each section having a flanged end for joining with the duplicate section and each section having a trunnion portion at its opposite end, an exterior surface of each trunnion being formed as a journal for support of the mill during rotation, an integral liner shaped in conformity with and bonded to the interior surface of each section to form a continuous fluid-tight liner when joined, means on each said trunnion for attachment to a power-transmission member, and means for holding said sections for conjoint rotation in fluid-tight engagement so as to permit uninterrupted flow of pulp from one trunnion to the other.

6. In a symmetrical grinding mill, a hollow body formed of two duplicate sections joined in end-to-end arrangement to provide a single chamber and mounted for rotation about a substantially horizontal axis, each section having an internally recessed flanged end for joining with the duplicate section and each section having a trunnion portion at its opposite end, an exterior surface of each trunnion being formed as a journal for support of the mill during rotation, a rubber liner shaped in conformity with and bonded to the interior surface of each section, inclusive of the internal recess, and means for holding said flanges for conjoint rotation in fluid-tight engagement about the periphery of the mill.

7. A grinding mill comprising a shell, inclusive of hollow trunnions and an intermediate spherical portion formed by two duplicate sections joined midway of the mill, an exterior surface of each trunnion being formed as a journal, a bearing assembly for each journal supporting the mill for rotation about a substantially horizontal axis, an integral liner shaped in conformity with and bonded to the entire interior surface of each section, a normally closed drain opening in each section of the mill and spaced approximately 180° from each other, and a liquid sealing closure for each trunnion.

8. The combination with a grinding mill of the hollow trunnion type, of a supporting frame, inclusive of bearings fixed on said frame and supporting the mill for rotation about a substantially horizontal axis, a power transmission system, inclusive of a prime mover fixed on said frame in driving connection with said mill, a detachable closure having means for its movement into fluid-sealing engagement with the feed trunnion of the mill, another detachable closure, including a grate member normally held in the discharge trunnion of the mill and having means for moving said closure in and out of fluid-sealing engagement with said grate member, a supporting structure for said frame, including a pivoted mounting for swinging said frame and its associated parts from a horizontal to a vertical position, and means for swinging said frame and holding the frame against swinging movement in each said position.

References Cited in the file of this patent

UNITED STATES PATENTS

| | | |
|---|---|---|
| 515,217 | Hall | Feb. 20, 1894 |

| | | |
|---|---|---|
| 944,997 | Abbe | Dec. 28, 1909 |
| 1,087,967 | Moussette | Feb. 24, 1914 |
| 1,335,269 | Ball | Mar. 30, 1920 |
| 1,517,538 | Daman | Dec. 2, 1924 |
| 1,933,764 | Ruth | Nov. 7, 1933 |
| 2,024,439 | Evans | Dec. 17, 1935 |
| 2,056,583 | Moussette | Oct. 6, 1936 |
| 2,208,077 | Linke | July 16, 1940 |